United States Patent
Benisty

(10) Patent No.: US 12,436,680 B2
(45) Date of Patent: Oct. 7, 2025

(54) NVMe COPY COMMAND ACCELERATION

(71) Applicant: Sandisk Technologies, Inc., Milpitas, CA (US)

(72) Inventor: Shay Benisty, Beer Sheva (IL)

(73) Assignee: Sandisk Technologies, Inc., Milpitas, CA (US)

( * ) Notice: Subject to any disclaimer, the term of this patent is extended or adjusted under 35 U.S.C. 154(b) by 95 days.

(21) Appl. No.: 17/950,386

(22) Filed: Sep. 22, 2022

(65) Prior Publication Data

US 2024/0103726 A1    Mar. 28, 2024

(51) Int. Cl.
     *G06F 3/06*      (2006.01)

(52) U.S. Cl.
     CPC .......... *G06F 3/0611* (2013.01); *G06F 3/0629* (2013.01); *G06F 3/0659* (2013.01); *G06F 3/0679* (2013.01)

(58) Field of Classification Search
     CPC .... G06F 3/0611; G06F 3/0629; G06F 3/0659; G06F 3/0679; G06F 3/061; G06F 3/064; G06F 3/0658
See application file for complete search history.

(56) References Cited

U.S. PATENT DOCUMENTS

| | | | |
|---|---|---|---|
| 7,958,430 B1 | 6/2011 | Kolokowsky et al. |
| 9,274,978 B2 | 3/2016 | DeForest et al. |
| 10,007,443 B1 | 6/2018 | Rajadnya et al. |
| 10,185,658 B2 | 1/2019 | O'Krafka et al. |
| 10,452,278 B2 | 10/2019 | Benisty |
| 10,564,872 B2 | 2/2020 | Benisty |
| 10,915,448 B2 | 2/2021 | Velayuthaperumal et al. |
| 10,936,226 B2 | 3/2021 | Kanno |
| 2002/0075560 A1 | 6/2002 | Foursa |
| 2006/0187908 A1 | 8/2006 | Shimozono et al. |
| 2009/0319720 A1 | 12/2009 | Stefanus et al. |
| 2013/0138904 A1 | 5/2013 | Min |
| 2016/0004438 A1 | 1/2016 | Moon et al. |

(Continued)

FOREIGN PATENT DOCUMENTS

| | | |
|---|---|---|
| JP | 2013062616 A | 4/2013 |
| KR | 101750744 B1 | 6/2017 |

OTHER PUBLICATIONS

International search report for PCT/US2022/013917 dated May 18, 2022.
Written opinion for PCT/US2022/013917 dated May 22, 2022.

*Primary Examiner* — Jason W Blust
(74) *Attorney, Agent, or Firm* — Patterson + Sheridan, LLP

(57) ABSTRACT

A data storage device includes a memory device and a controller coupled to the memory device. When a copy command is received by the controller from a host device, the controller reads the relevant data from one or more first locations of the memory device. The data is the processed by an Rx path, where the data is decoded, decrypted, and verified. Rather than providing the data back to the host device or being made available to the host device, a copy accelerator loops the data from the Rx path to a Tx path, where protection information is generated and added to the data and the data is encrypted and encoded. The data is then programmed back to the memory device in a second location. By using the copy accelerator, a latency associated with performing copy command operations and other data management operations may be decreased.

16 Claims, 6 Drawing Sheets

(56) References Cited

U.S. PATENT DOCUMENTS

| | | |
|---|---|---|
| 2016/0224248 A1 | 8/2016 | Choi et al. |
| 2016/0239224 A1 | 8/2016 | Bhavith et al. |
| 2017/0220292 A1 | 8/2017 | Hashimoto |
| 2018/0089297 A1 | 3/2018 | Dong et al. |
| 2018/0150243 A1 | 5/2018 | Beard |
| 2018/0260145 A1 | 9/2018 | Margetts |
| 2018/0321987 A1 | 11/2018 | Benisty |
| 2019/0065102 A1 | 2/2019 | Shin et al. |
| 2019/0079702 A1 | 3/2019 | Yeon et al. |
| 2019/0146684 A1 | 5/2019 | Benisty et al. |
| 2019/0272119 A1 | 9/2019 | Brewer |
| 2019/0294344 A1 | 9/2019 | Hahn et al. |
| 2019/0361605 A1* | 11/2019 | Kanno ................. G06F 3/0688 |
| 2020/0019542 A1 | 1/2020 | Brown et al. |
| 2020/0241798 A1 | 7/2020 | Kanno |
| 2021/0191657 A1 | 6/2021 | Moss et al. |
| 2022/0057959 A1 | 2/2022 | Yang et al. |
| 2023/0268018 A1* | 8/2023 | Rayaprolu ............ G06F 3/0619 |

* cited by examiner

NVMe COPY COMMAND ACCELERATION

BACKGROUND OF THE DISCLOSURE

Field of the Disclosure

Embodiments of the present disclosure generally relate to data storage devices, such as solid state drives (SSDs), and, more specifically, data management operations such as completing copy command operations.

Description of the Related Art

Data storage devices, such as SSDs, may be used in computers in applications where relatively low latency and high capacity storage are desired. For example, SSDs may exhibit lower latency, particularly for random reads and writes, than hard disk drives (HDDs). Typically, a controller of the SSD receives a command to read or write data from a host device to a memory device. The data is read from or written to one or more blocks in the memory device depending upon whether the command is a read or write command.

The data storage device utilizes data management operations, such as garbage collection, to free up valuable space. As updated or consolidated data is written to the one or more blocks of the memory device, the previous versions of the updated or non-consolidated data may no longer be needed. Garbage collection may re-allocate one or more blocks, one erased, to an available pool of empty blocks. Furthermore, the relevant data previously stored on the one or more blocks may be re-written to one or more blocks sequentially. Likewise, a host device may send a copy command to the data storage device, where executing the copy command may result in freeing up valuable space. Copy commands are performed using multiple discontinuous reads from the memory device and writing the data back to a single contiguous location of the memory device. Executing copy commands may require large buffers or may result in low data storage device performance.

Therefore, there is a need for an improved method to complete copy command operations and other data management operations.

SUMMARY OF THE DISCLOSURE

The present disclosure generally relates to data storage devices, such as solid state drives (SSDs), and, more specifically, data management operations such as completing copy command operations. A data storage device includes a memory device and a controller coupled to the memory device. When a copy command is received by the controller from a host device, the controller reads the relevant data from one or more first locations of the memory device. The data is processed by an Rx path, where the data is decoded, decrypted, and verified. Rather than providing the data back to the host device or being made available to the host device, a copy accelerator loops the data from the Rx path to a Tx path, where protection information is generated and added to the data and the data is encrypted and encoded. The data is then programmed back to the memory device in a second location. By using the copy accelerator, a latency associated with performing copy command operations and other data management operations may be decreased.

In one embodiment, a data storage device includes a memory device and a controller coupled to the memory device. The controller is configured to fetch data associated with a copy command operation from one or more first locations of the memory device, perform a plurality of operations in an Rx path on the data, transfer the data from the Rx path to a Tx path in a loopback mode, perform a plurality of operations in the Tx path on the data, and program the data to a second location of the memory device.

In another embodiment, a data storage device includes a memory device and a controller coupled to the memory device. The controller includes a peripheral component interconnect (PCI) express (PCIe) bus, a Tx path coupled to the PCIe bus, a flash interface module (FIM) coupled to the Tx path and the memory device, an Rx path coupled to the FIM and the PCIe, and a copy accelerator coupled to the Rx path and the Tx path. The copy accelerator is configured to provide data from the Rx path to the Tx path.

In another embodiment, a data storage device includes memory means and a controller coupled to the memory means. The controller is configured to verify protection information associated with data retrieved from one or more first locations of the memory means, transfer the data from an Rx path to a Tx path in a loopback mode, where the data is not provided to a host device in the loopback mode, generate and add new protection information to the data transferred from the Rx path to the Tx path, and program the data to the memory means from the Tx path.

BRIEF DESCRIPTION OF THE DRAWINGS

So that the manner in which the above recited features of the present disclosure can be understood in detail, a more particular description of the disclosure, briefly summarized above, may be had by reference to embodiments, some of which are illustrated in the appended drawings. It is to be noted, however, that the appended drawings illustrate only typical embodiments of this disclosure and are therefore not to be considered limiting of its scope, for the disclosure may admit to other equally effective embodiments.

To facilitate understanding, identical reference numerals have been used, where possible, to designate identical elements that are common to the figures. It is contemplated that elements disclosed in one embodiment may be beneficially utilized on other embodiments without specific recitation.

DETAILED DESCRIPTION

In the following, reference is made to embodiments of the disclosure. However, it should be understood that the disclosure is not limited to specifically described embodiments. Instead, any combination of the following features and elements, whether related to different embodiments or not, is contemplated to implement and practice the disclosure. Furthermore, although embodiments of the disclosure may achieve advantages over other possible solutions and/or over the prior art, whether or not a particular advantage is achieved by a given embodiment is not limiting of the disclosure. Thus, the following aspects, features, embodiments, and advantages are merely illustrative and are not considered elements or limitations of the appended claims except where explicitly recited in a claim(s). Likewise, reference to "the disclosure" shall not be construed as a generalization of any inventive subject matter disclosed herein and shall not be considered to be an element or limitation of the appended claims except where explicitly recited in a claim(s).

The present disclosure relates to data storage devices, such as solid state drives (SSDs), and, more specifically, data management operations such as completing copy command operations. A data storage device includes a memory device and a controller coupled to the memory device. When a copy command is received by the controller from a host device, the controller reads the relevant data from one or more first locations of the memory device. The data is the processed by an Rx path, where the data is decoded, decrypted, and verified. Rather than providing the data back to the host device or being made available to the host device, a copy accelerator loops the data from the Rx path to a Tx path, where protection information is generated and added to the data and the data is encrypted and encoded. The data is then programmed back to the memory device in a second location. By using the copy accelerator, a latency associated with performing copy command operations and other data management operations may be decreased.

Figure 1:
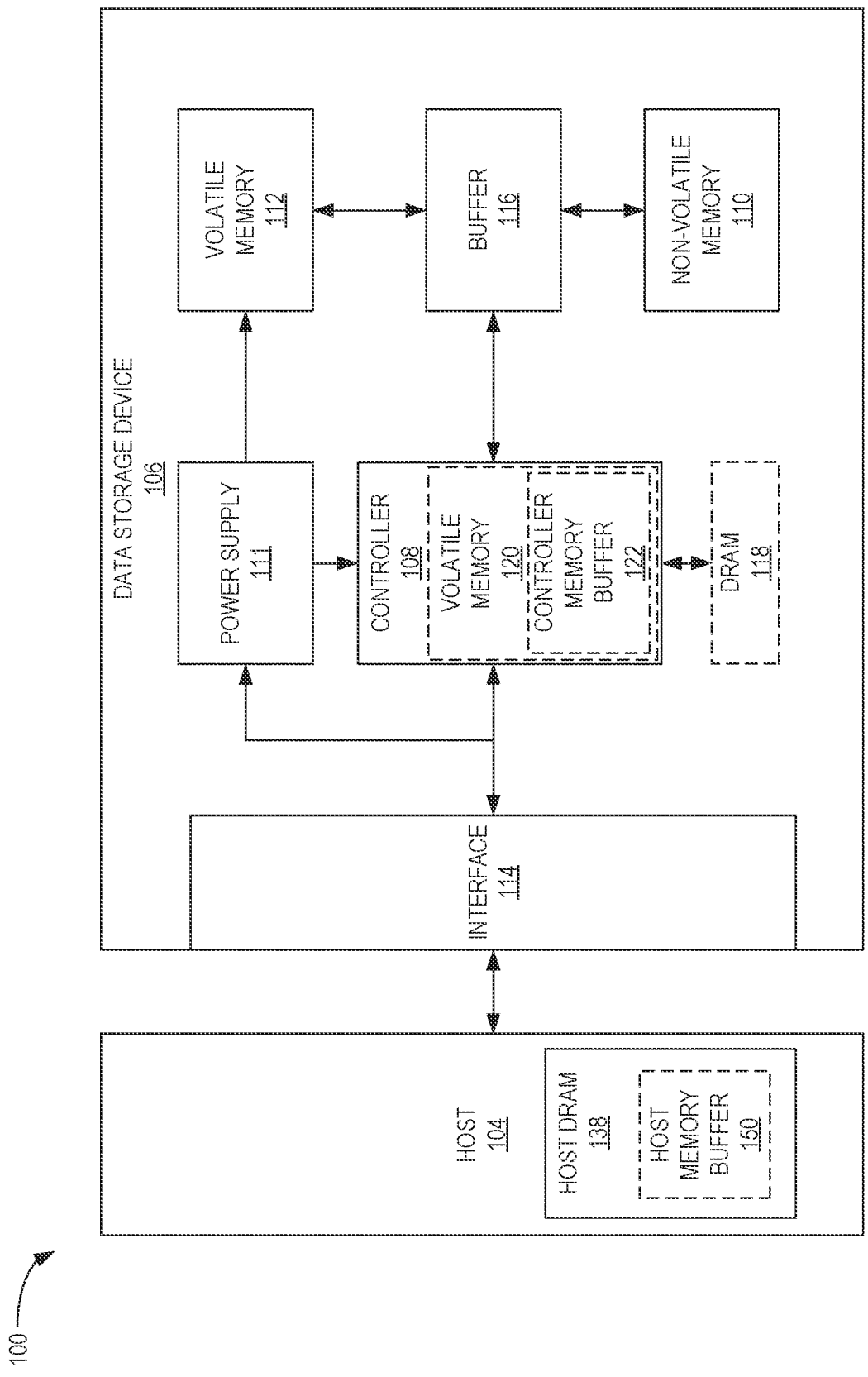
FIG. 1 is a schematic block diagram illustrating a storage system in which a data storage device may function as a storage device for a host device, according to certain embodiments.

FIG. 1 is a schematic block diagram illustrating a storage system 100 having a data storage device 106 that may function as a storage device for a host device 104, according to certain embodiments. For instance, the host device 104 may utilize a non-volatile memory (NVM) 110 included in data storage device 106 to store and retrieve data. The host device 104 comprises a host DRAM 138. In some examples, the storage system 100 may include a plurality of storage devices, such as the data storage device 106, which may operate as a storage array. For instance, the storage system 100 may include a plurality of data storage devices 106 configured as a redundant array of inexpensive/independent disks (RAID) that collectively function as a mass storage device for the host device 104.

The host device 104 may store and/or retrieve data to and/or from one or more storage devices, such as the data storage device 106. As illustrated in FIG. 1, the host device 104 may communicate with the data storage device 106 via an interface 114. The host device 104 may comprise any of a wide range of devices, including computer servers, network-attached storage (NAS) units, desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or other devices capable of sending or receiving data from a data storage device.

The host DRAM 138 may optionally include a host memory buffer (HMB) 150. The HMB 150 is a portion of the host DRAM 138 that is allocated to the data storage device 106 for exclusive use by a controller 108 of the data storage device 106. For example, the controller 108 may store mapping data, buffered commands, logical to physical (L2P) tables, metadata, and the like in the HMB 150. In other words, the HMB 150 may be used by the controller 108 to store data that would normally be stored in a volatile memory 112, a buffer 116, an internal memory of the controller 108, such as static random access memory (SRAM), and the like. In examples where the data storage device 106 does not include a DRAM (i.e., optional DRAM 118), the controller 108 may utilize the HMB 150 as the DRAM of the data storage device 106.

The data storage device 106 includes the controller 108, NVM 110, a power supply 111, volatile memory 112, the interface 114, a write buffer 116, and an optional DRAM 118. In some examples, the data storage device 106 may include additional components not shown in FIG. 1 for the sake of clarity. For example, the data storage device 106 may include a printed circuit board (PCB) to which components of the data storage device 106 are mechanically attached and which includes electrically conductive traces that electrically interconnect components of the data storage device 106 or the like. In some examples, the physical dimensions and connector configurations of the data storage device 106 may conform to one or more standard form factors. Some example standard form factors include, but are not limited to, 3.5" data storage device (e.g., an HDD or SSD), 2.5" data storage device, 1.8" data storage device, peripheral component interconnect (PCI), PCI-extended (PCI-X), PCI Express (PCIe) (e.g., PCIe ×1, ×4, ×8, ×16, PCIe Mini Card, MiniPCI, etc.). In some examples, the data storage device 106 may be directly coupled (e.g., directly soldered or plugged into a connector) to a motherboard of the host device 104.

Interface 114 may include one or both of a data bus for exchanging data with the host device 104 and a control bus for exchanging commands with the host device 104. Interface 114 may operate in accordance with any suitable protocol. For example, the interface 114 may operate in accordance with one or more of the following protocols: advanced technology attachment (ATA) (e.g., serial-ATA (SATA) and parallel-ATA (PATA)), Fibre Channel Protocol (FCP), small computer system interface (SCSI), serially attached SCSI (SAS), PCI, and PCIe, non-volatile memory express (NVMe), OpenCAPI, GenZ, Cache Coherent Interface Accelerator (CCIX), Open Channel SSD (OCSSD), or the like. Interface 114 (e.g., the data bus, the control bus, or both) is electrically connected to the controller 108, providing an electrical connection between the host device 104 and the controller 108, allowing data to be exchanged between the host device 104 and the controller 108. In some examples, the electrical connection of interface 114 may also permit the data storage device 106 to receive power from the host device 104. For example, as illustrated in FIG. 1, the power supply 111 may receive power from the host device 104 via interface 114.

The NVM 110 may include a plurality of memory devices or memory units. NVM 110 may be configured to store and/or retrieve data. For instance, a memory unit of NVM 110 may receive data and a message from controller 108 that instructs the memory unit to store the data. Similarly, the memory unit may receive a message from controller 108 that instructs the memory unit to retrieve data. In some examples, each of the memory units may be referred to as a die. In some examples, the NVM 110 may include a plurality of dies (i.e., a plurality of memory units). In some examples, each memory unit may be configured to store relatively large amounts of data (e.g., 128 MB, 256 MB, 512 MB, 1 GB, 2 GB, 4 GB, 8 GB, 16 GB, 32 GB, 64 GB, 128 GB, 256 GB, 512 GB, 1 TB, etc.).

In some examples, each memory unit may include any type of non-volatile memory devices, such as flash memory devices, phase-change memory (PCM) devices, resistive random-access memory (ReRAM) devices, magneto-resistive random-access memory (MRAM) devices, ferroelectric random-access memory (F-RAM), holographic memory devices, and any other type of non-volatile memory devices.

The NVM 110 may comprise a plurality of flash memory devices or memory units. NVM Flash memory devices may include NAND or NOR-based flash memory devices and may store data based on a charge contained in a floating gate of a transistor for each flash memory cell. In NVM flash memory devices, the flash memory device may be divided into a plurality of dies, where each die of the plurality of dies includes a plurality of physical or logical blocks, which may be further divided into a plurality of pages. Each block of the plurality of blocks within a particular memory device may include a plurality of NVM cells. Rows of NVM cells may be electrically connected using a word line to define a page of a plurality of pages. Respective cells in each of the plurality of pages may be electrically connected to respective bit lines. Furthermore, NVM flash memory devices may be 2D or 3D devices and may be single level cell (SLC), multi-level cell (MLC), triple level cell (TLC), or quad level cell (QLC). The controller 108 may write data to and read data from NVM flash memory devices at the page level and erase data from NVM flash memory devices at the block level.

The power supply 111 may provide power to one or more components of the data storage device 106. When operating in a standard mode, the power supply 111 may provide power to one or more components using power provided by an external device, such as the host device 104. For instance, the power supply 111 may provide power to the one or more components using power received from the host device 104 via interface 114. In some examples, the power supply 111 may include one or more power storage components configured to provide power to the one or more components when operating in a shutdown mode, such as where power ceases to be received from the external device. In this way, the power supply 111 may function as an onboard backup power source. Some examples of the one or more power storage components include, but are not limited to, capacitors, super-capacitors, batteries, and the like. In some examples, the amount of power that may be stored by the one or more power storage components may be a function of the cost and/or the size (e.g., area/volume) of the one or more power storage components. In other words, as the amount of power stored by the one or more power storage components increases, the cost and/or the size of the one or more power storage components also increases.

The volatile memory 112 may be used by controller 108 to store information. Volatile memory 112 may include one or more volatile memory devices. In some examples, controller 108 may use volatile memory 112 as a cache. For instance, controller 108 may store cached information in volatile memory 112 until the cached information is written to the NVM 110. As illustrated in FIG. 1, volatile memory 112 may consume power received from the power supply 111. Examples of volatile memory 112 include, but are not limited to, random-access memory (RAM), dynamic random access memory (DRAM), static RAM (SRAM), and synchronous dynamic RAM (SDRAM (e.g., DDR1, DDR2, DDR3, DDR3L, LPDDR3, DDR4, LPDDR4, and the like)). Likewise, the optional DRAM 118 may be utilized to store mapping data, buffered commands, logical to physical (L2P) tables, metadata, cached data, and the like in the optional DRAM 118. In some examples, the data storage device 106 does not include the optional DRAM 118, such that the data storage device 106 is DRAM-less. In other examples, the data storage device 106 includes the optional DRAM 118.

Controller 108 may manage one or more operations of the data storage device 106. For instance, controller 108 may manage the reading of data from and/or the writing of data to the NVM 110. In some embodiments, when the data storage device 106 receives a write command from the host device 104, the controller 108 may initiate a data storage command to store data to the NVM 110 and monitor the progress of the data storage command. Controller 108 may determine at least one operational characteristic of the storage system 100 and store at least one operational characteristic in the NVM 110. In some embodiments, when the data storage device 106 receives a write command from the host device 104, the controller 108 temporarily stores the data associated with the write command in the internal memory or write buffer 116 before sending the data to the NVM 110.

The controller 108 may include an optional second volatile memory 120. The optional second volatile memory 120 may be similar to the volatile memory 112. For example, the optional second volatile memory 120 may be SRAM. The controller 108 may allocate a portion of the optional second volatile memory to the host device 104 as controller memory buffer (CMB) 122. The CMB 122 may be accessed directly by the host device 104. For example, rather than maintaining one or more submission queues in the host device 104, the host device 104 may utilize the CMB 122 to store the one or more submission queues normally maintained in the host device 104. In other words, the host device 104 may generate commands and store the generated commands, with or without the associated data, in the CMB 122, where the controller 108 accesses the CMB 122 in order to retrieve the stored generated commands and/or associated data.

Figure 2:
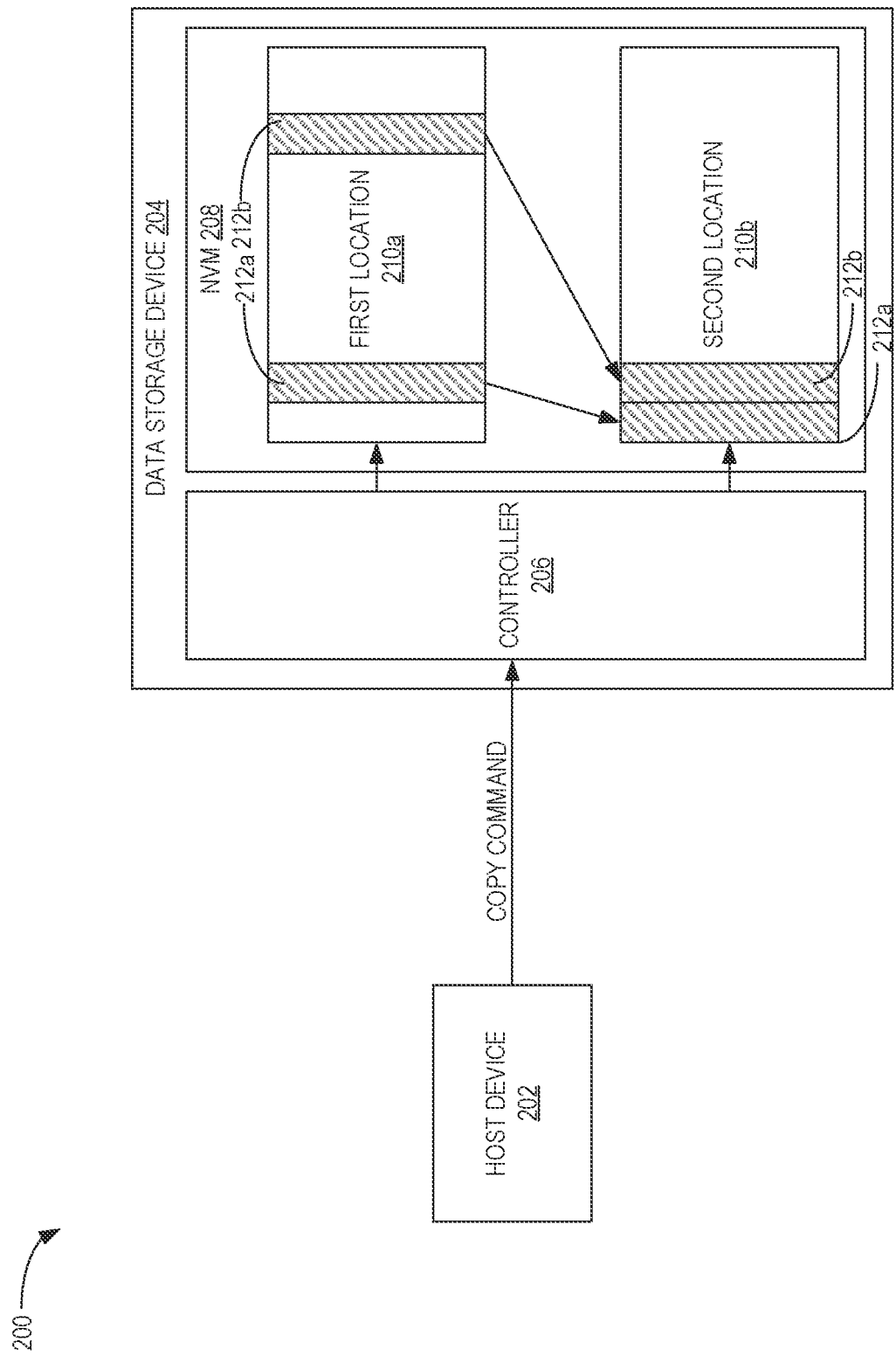
FIG. 2 is an exemplary illustration of a data storage device of a storage system performing a copy command operation, according to certain embodiments.

FIG. 2 is an exemplary illustration of a data storage device 204 of a storage system 200 performing a copy command operation, according to certain embodiments. It is to be understood that other data management operations, such as garbage collection, may be applicable to the described embodiments.

The storage system 200 includes a host device 202 coupled to the data storage device 204. The data storage device 204 includes a controller 206 and an NVM 208. The host device 202 sends a copy command to copy data from one or more source logical block address (LBA) ranges of the NVM 208 to a single consecutive destination LBA range of the NVM 208. For example, a first location 210a of the NVM 208 includes first data 212a and second data 212b, where the first data 212a and the second data 212b are non-consecutive. When the controller 206 executes the copy command, the controller 206 reads the first data 212a and the second data 212b from the respective locations of the first location 210a of the NVM 208. The first data 212a and the second data 212b are then programmed to a second location 210b, where the first data 212a and the second data 212b are programmed consecutively to the second location 210b.

Figure 3:
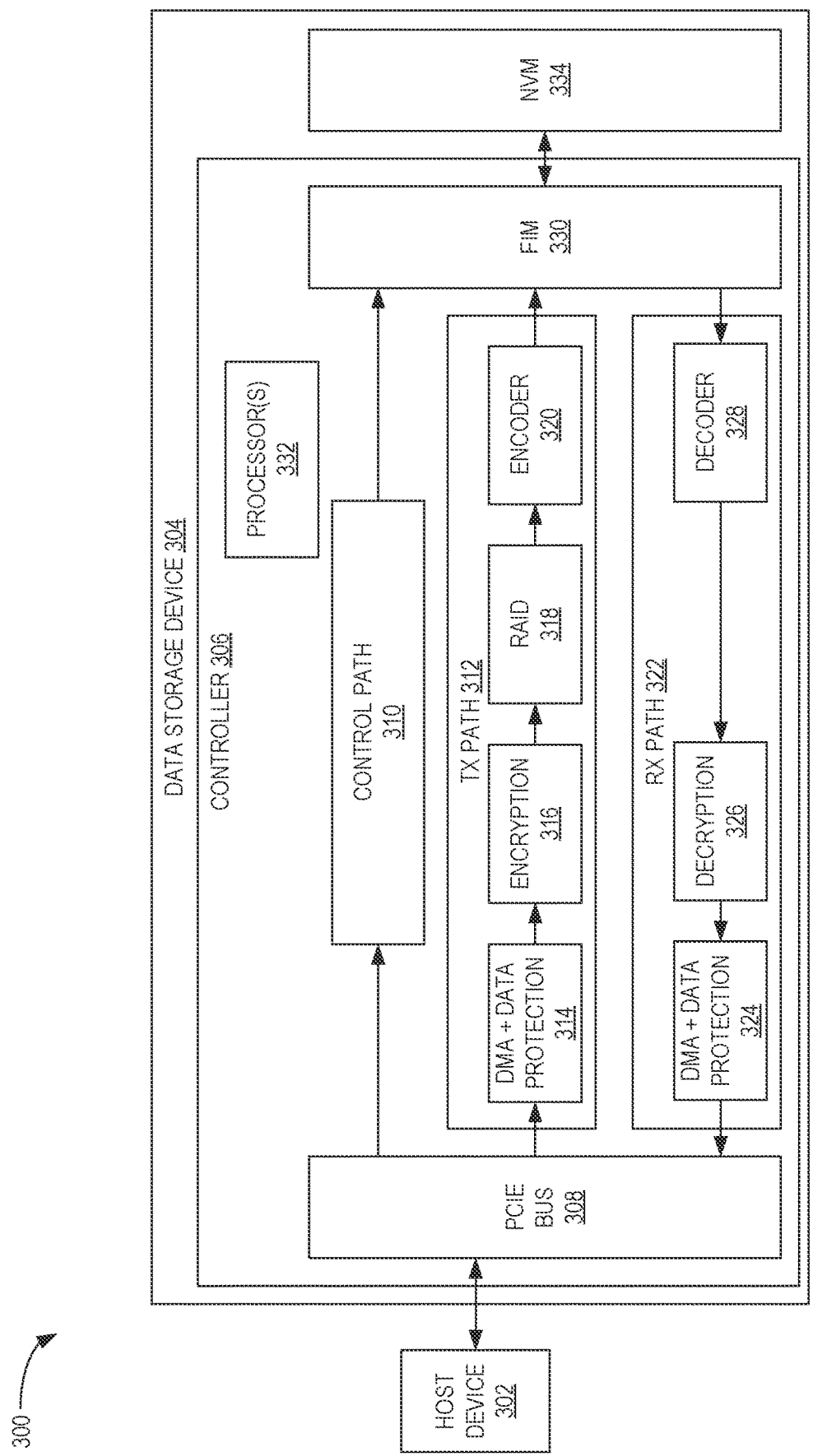
FIG. 3 is a schematic block diagram illustrating a storage system, according to certain embodiments.

FIG. 3 is a schematic block diagram illustrating a storage system 300, according to certain embodiments. The storage system 300 may be similar to the storage system 100 of FIG. 1. The storage system 300 includes a host device 302 coupled to a data storage device 304. The data storage device 304 includes a controller 306 and an NVM 334. The controller 306 includes a PCIe bus 308, a control path 310 coupled to the PCIe bus 308, a transmit (Tx) path 312 coupled to the PCIe bus 308, a flash interface module (FIM) 330 coupled to the control path 310, the Tx path 312, and the NVM 334, a receive (Rx) path 322 coupled to the PCIe bus 308 and the FIM 330, and one or more processors 332. The Tx path 312 and the Rx path 322 may be collectively referred to as a data path. The Tx path 312 includes a Tx direct memory access (DMA) and data protection module 314, an encryption engine 316, a redundant array of independent disks (RAID) engine 318, and an encoder 320. The Rx path 322 includes a Rx DMA and data protection module 324, a decryption engine 326, and a decoder 328. The Tx path 312 and the Rx path 322 may operate in parallel.

The controller 306 may receive data and commands at the PCIe bus 308 from the host device 302, where the data and commands are processed by the control path 310 and the Tx path 312. For example, when a write command is received by the controller 306 at the PCIe bus 308, the control path 310 processes the write command and generates any necessary one or more commands to write the data to the NVM 334 as well as performs address translation corresponding to the write command. Likewise, the data is provided to the Tx path 312.

The Tx DMA and data protection module 314 may be configured to generate protection information for the received data, add the generated protection information to the received data, and allow peripheral components to transfer data directly to and from the NVM 334 without the need to involve the one or more processors 332. The encryption engine 316 may generate an encryption/decryption key for the data and encrypt the data received from the Tx DMA and data protection module 314 based on the encryption/decryption key. The encryption engine 316 may operate using an advanced encryption standard protocol. The encryption key may be unique to each encrypted data set. The encrypted data is then provided to the RAID engine 318, where the RAID engine 318 may generate parity information for the data received from the host device 302. The data is then provided to the encoder 320, where the encoder 320 encodes the data. The encoded data is provided to the FIM 330, where the FIM 330 may access the NVM 334 to program the data to the relevant location of the NVM 334.

Likewise, when a read command is received by the controller 306 at the PCIe bus 308, the control path 310 processes the read command and generates any necessary one or more commands to read the relevant data from the NVM 334. The controller 306 utilized the FIM 330 to access the NVM 334 and read the relevant data from the one or more locations of the NVM corresponding to the one or more LBAs associated with the read command. The data read from the NVM 334 is then provided to the Rx path 322, where the decoder 328 decodes the data, the decryption engine 326 decrypts the data using the relevant encryption/decryption key, and the Rx DMA and data protection module 324 verifies the data read from the NVM 334 and sends the data to a host DRAM, such as the host DRAM 138 of FIG. 1, of the host device 302. The decryption engine 326 may operate using the advanced encryption standard protocol.

Figure 4:
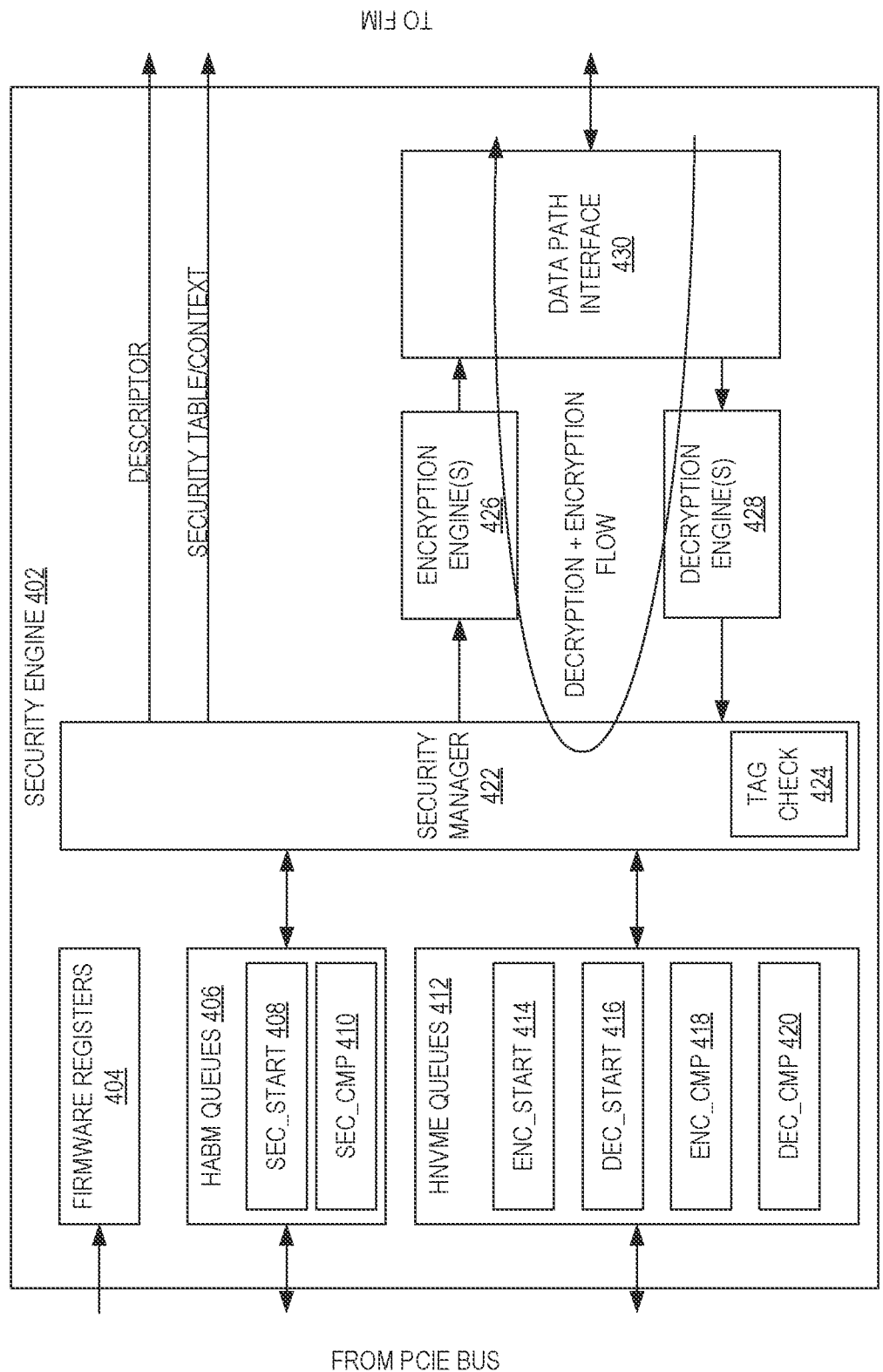
FIG. 4 is a schematic block diagram illustrating a security engine, according to certain embodiments.

FIG. 4 is a schematic block diagram illustrating a security engine 402, according to certain embodiments. The Tx path 312 of FIG. 3 and the Rx path 322 of FIG. 3 may be part of the security engine 402. The security engine 402 includes a plurality of firmware registers 404, a plurality of host automatic buffer manager (ABM) queues 406, a plurality of host NVMe (HNVMe) queues 412, a security manager 422, a plurality of encryption engines 426, a plurality of decryption engines 428, and a data path interface 430. The ABM may be a scheduler of a controller, such as the controller 306 of FIG. 3. The firmware registers 404 may be responsible for communicating between the firmware of a controller, such as the controller 306 and the relevant hardware components of the security engine 402. The plurality of firmware registers 404, the plurality of HABM queues 406, and the plurality of HNVMe queues 412 may receive data from a PCIe bus, such as the PCIe bus 308 of FIG. 3, or a host interface module. The plurality of HABM queues 406 each includes a security (SEC)_start queue 408 and a SEC_completion (CMP) queue 410. The SEC_start queue 408 may store pending security requests (e.g., encrypt/decrypt requests) and relevant parameters relating to the pending security requests, such as addresses, keys, and the like. The SEC CMP queue 410 may store done notifications with the status and identifiers that may aid in help in classifying the messages. The plurality of HNVMe queues 412 each includes an encoder (ENC)_start queue 414, a decoder (DEC)_start queue 416, an ENC_CMP queue 418, and a DEC_CMP queue 420.

The security manager 422 includes a tag check module 424. The tag check module 424 may check a corresponding tag associated with data read from a memory device, such as the NVM 334 of FIG. 3, where the tag is provided by a host device, such as the host device 302 of FIG. 3. The tag may be provided by the host device 302 when the data is received from the host device 302 and when a corresponding read command for the data is received from the host device 302. The tag may be a storage tag and is checked as part of an end-to-end data protection processing to be used for the write portion of a copy command operation. Furthermore, the tag check module 424 may be responsible for checking and updating protection information associated with the data dynamically in the decryption and encryption flow The data path interface 430 is configured to interact with a FIM, such as the FIM 330 of FIG. 3. The data path interface 430 may send data from an encryption engine of the plurality of encryption engines 426 to the FIM 330 to be programmed to the NVM 334 or receive data from the FIM 330 to be decrypted by a decryption engine of the plurality of decryption engines 428.

The security engine 402 may be configured to perform decrypt and encrypt operations as single atomic operation while looping back the data from the Rx path 322 to the Tx path 312 during a copy command operation or a relevant data management operation. A decryption engine of the plurality of decryption engines 428 may utilize an encryption/decryption key associated with the data received from the NVM 334 to decrypt the data. When the data is looped back through the security manager 422 and to an encryption engine of the plurality of encryption engines 426, the security manager may generate a new encryption/decryption key to encrypt the data with. The encryption/decryption key may depend on the destination LBAs of the data. In other words, the encryption/decryption key depends on the LBAs corresponding to the physical location of where the data will be programmed to the NVM 334.

Figure 5:
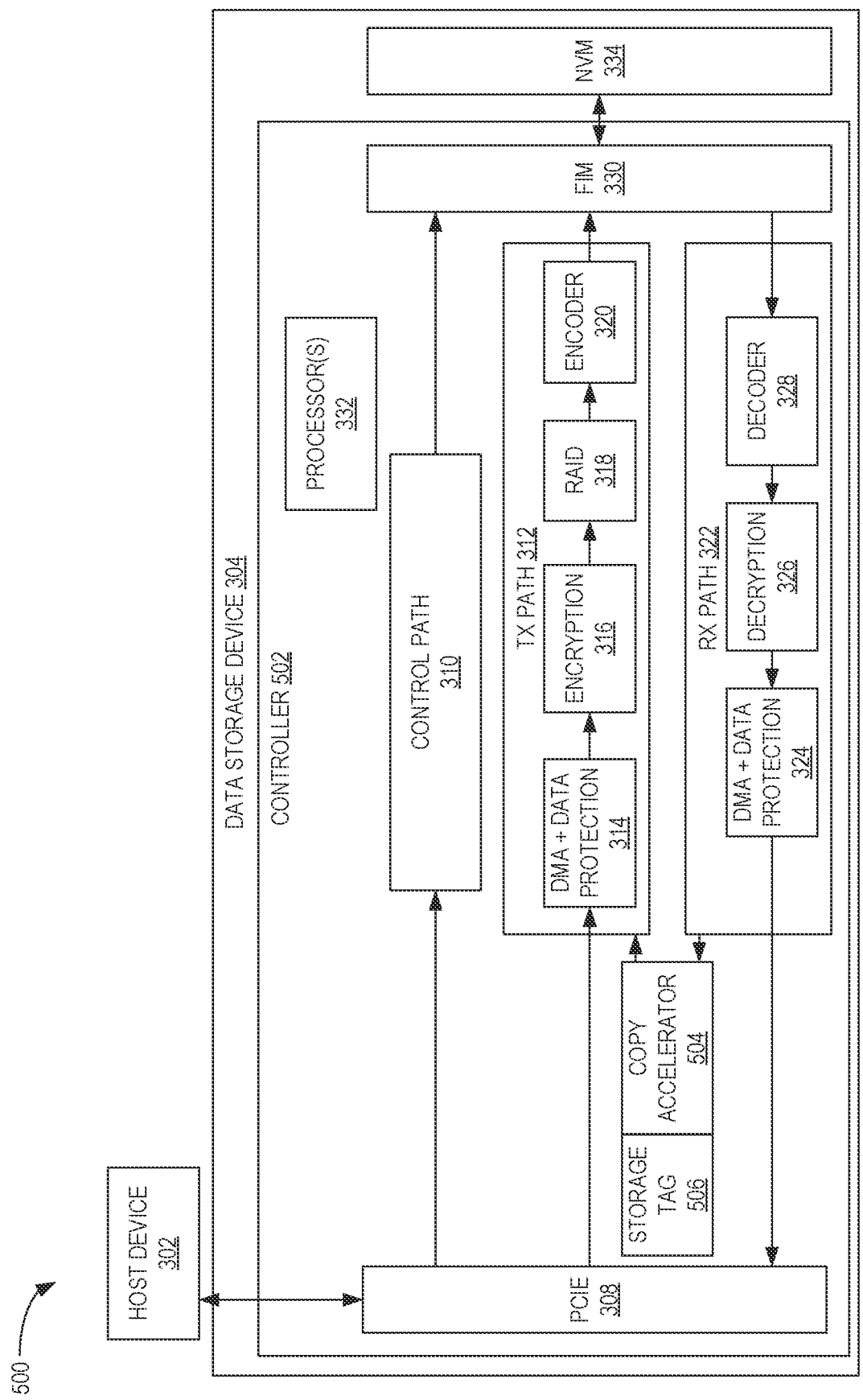
FIG. 5 is a schematic block diagram illustrating a storage system in which a data storage device includes a copy accelerator and a storage tag module 506, according to certain embodiments.

FIG. 5 is a schematic block diagram illustrating a storage system 500 in which a data storage device 304 includes a copy accelerator 504 and a storage tag module 506, according to certain embodiments. The storage system 500 may be the storage system 300 of FIG. 3 with the addition of the copy accelerator 504 and the storage tag module 506. For simplification purposes, common elements between the storage system 300 and the storage system 500 are referenced with the same reference numerals. The storage tag module 506 may be the tag check module 424 of FIG. 4.

The controller 502 further includes the copy accelerator 504 and the storage tag module 506 coupled to the copy accelerator 504. The copy accelerator 504 is coupled to the Rx path 322 and the Tx path 312. The copy accelerator 504 is configured to loop data back from the Rx path 322 to the Tx path 312, where the looping is a closed loop. In other words, the data that is looped back may not be available or visible to the host device 302. Furthermore, because the copy accelerator 504 transfers the data from the Rx path 322 to the Tx path 312, additional or extra buffers may not be needed to cache the data to send to the host device 302. The storage tag module 506 may be configured to check protection information associated with the data read from the NVM 334 and generate/add new protection information to the data that is to be programmed to the NVM 334. The new protection information may be based on a destination location of where the data will be programmed in the NVM 334.

Figure 6:
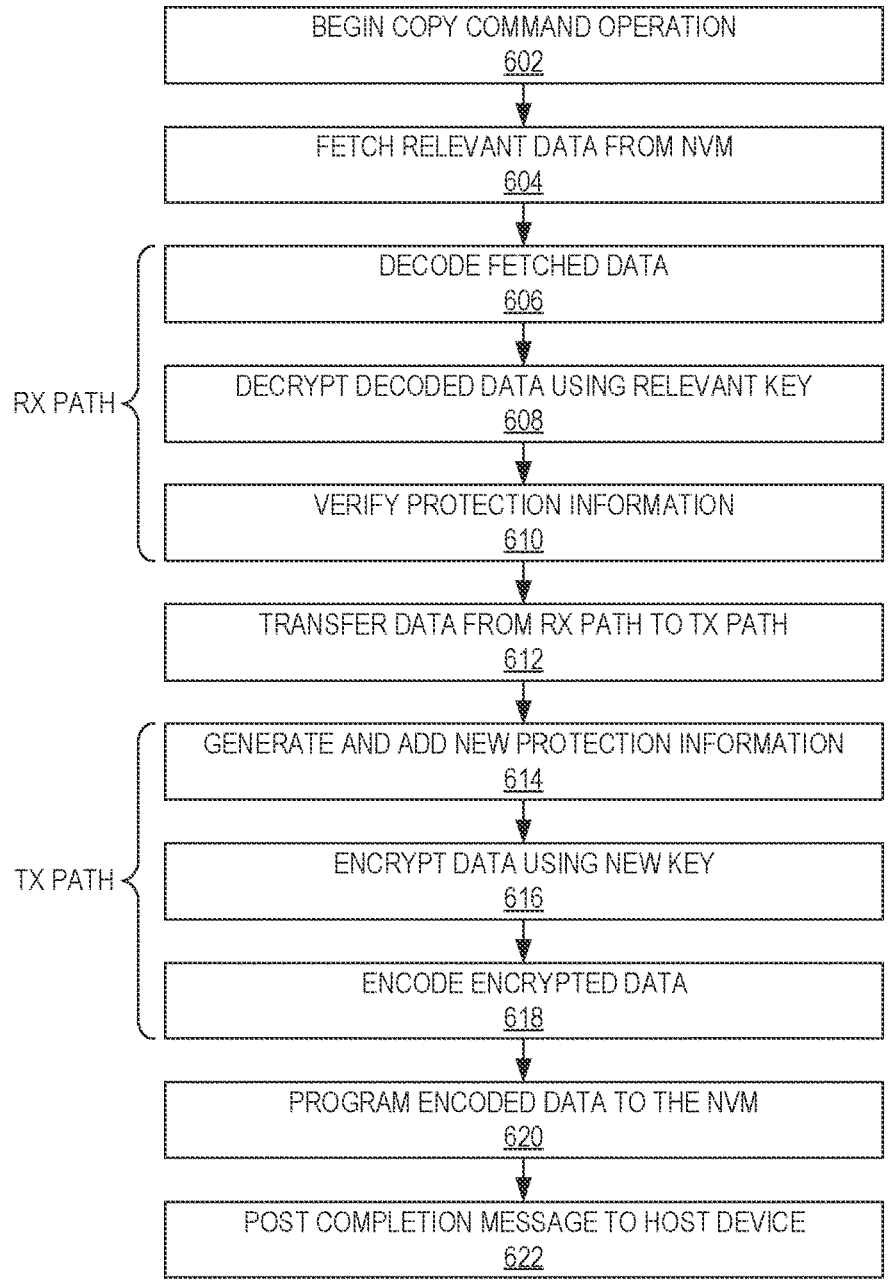
FIG. 6 is a flow diagram illustrating a method of performing a copy command operation, according to certain embodiments.

FIG. 6 is a flow diagram illustrating a method 600 of performing a copy command operation, according to certain embodiments. Method 600 may be implemented by a controller, such as the controller 502 having the copy accelerator 504 and the storage tag module 506 of FIG. 5. For exemplary purposes, aspects of the storage system 500 of FIG. 5 may be referenced herein.

At block 602, the controller 502 begins a copy command operation. For example, the copy command may be sent to the controller 502 from the host device 302. At block 604, the controller 502 fetches the relevant data associated with the copy command operation from one or more first locations of the NVM 334. At block 606, the decoder 328 decodes the data fetched from the NVM 334. At block 608, the decryption engine 326 decrypts the decoded data using a decryption key associated with the data. At block 610, the Rx DMA and data protection module 324 verifies the protection information associated with the data. At block 612, the copy accelerator 504 transfers the data from the Rx path 322 to the Tx path 312.

At block 614, the Tx DMA and data protection module 314 generates and adds new protection information based on the destination location of where the data will be relocated to in the NVM 334. At block 616, the encryption engine 316 encrypts the data with a new encryption key. At block 618, the encoder 320 encodes the encrypted data. At block 620, the controller 502 programs the encoded data to the NVM 334. At block 622, the controller 502 posts a completion message to the host device 302 indicating that the copy command operation is completed. The completion message may also include one or more LBA mappings corresponding to the data stored to the NVM 334.

By using a copy accelerator to loopback data corresponding to copy command operations and other relevant data management operations, performance of the data storage device, while performing the copy command operations and other relevant data management operations, may be improved.

In one embodiment, a data storage device includes a memory device and a controller coupled to the memory device. The controller is configured to fetch data associated with a copy command operation from one or more first locations of the memory device, perform a plurality of operations in an Rx path on the data, transfer the data from the Rx path to a Tx path in a loopback mode, perform a plurality of operations in the Tx path on the data, and program the data to a second location of the memory device.

The loopback mode includes not providing the data back to a host device between the Rx path and the Tx path. The plurality of operations in the Rx path includes decoding the data, decrypting the data, and verifying protection information associated with the data. The decrypting uses a last generated key associated with the data. The controller is further configured to generate a key associated with the data when the data is encrypted. The plurality of operations in the Tx path includes generating protection information for the data, adding the generated protection information to the data, encrypting the data, and encoding the data. The generated protection information is generated based on a logical block address of the second location. The data programmed to the location of the memory device is the encoded data. The controller is further configured to check and update protection information associated with the data in the Rx path and the Tx path dynamically. A decryption engine of the Rx path and an encryption engine of the Tx path are both activated. A decryption operation associated with the copy command operation and an encryption operation associated with the copy command operation are consecutive operations.

In another embodiment, a data storage device includes a memory device and a controller coupled to the memory device. The controller includes a peripheral component interconnect (PCI) express (PCIe) bus, a Tx path coupled to the PCIe bus, a flash interface module (FIM) coupled to the Tx path and the memory device, an Rx path coupled to the FIM and the PCIe, and a copy accelerator coupled to the Rx path and the Tx path. The copy accelerator is configured to provide data from the Rx path to the Tx path.

The Tx path includes a Tx direct memory access (DMA) and data protection module, an encryption engine configured to encrypt the data, a redundant array of independent disks (RAID) engine, and an encoder configured to encode the data. The Rx path includes a decoder configured to decode the data received from the memory device, a decryption engine configured to decrypt the data received from the decoder, and an Rx DMA and data protection module. The controller further includes a tag check module. The tag check module is configured to check a tag associated with the data. The tag is provided by a host device associated with the data. The copy accelerator is configured to provide the decrypted data from the Rx DMA and protection module to the Tx DMA and protection module. The provided decrypted data is not accessible by a host device. The copy accelerator is used to move data from one or more first locations of the memory device to a second location of the memory device.

In another embodiment, a data storage device includes memory means and a controller coupled to the memory means. The controller is configured to verify protection information associated with data retrieved from one or more first locations of the memory means, transfer the data from an Rx path to a Tx path in a loopback mode, where the data is not provided to a host device in the loopback mode, generate and add new protection information to the data transferred from the Rx path to the Tx path, and program the data to the memory means from the Tx path. The controller is further configured to check a tag associated with the data. The tag is retrieved from the memory means with the data. The tag is provided by the host device.

While the foregoing is directed to embodiments of the present disclosure, other and further embodiments of the disclosure may be devised without departing from the basic scope thereof, and the scope thereof is determined by the claims that follow.

What is claimed is:
1. A data storage device, comprising:
   a memory device; and a controller coupled to the memory device, wherein the controller is configured to:
  fetch data associated with a copy command operation from one or more first locations of the memory device;
  perform a plurality of operations in an Rx path on the data, wherein an operation of the plurality of operations in the Rx path is decryption;
  transfer the data from the Rx path to a Tx path in a loopback mode using a copy accelerator that is separate and distinct from a peripheral component interconnect express (PCIe) bus, wherein a storage tag module that is separate and distinct from the copy accelerator and separate and distinct from the PCIe bus checks protection information associated with the data and generates new protection information for the data;
  perform a plurality of operations in the Tx path on the data, wherein an operation of the plurality of operations in the Tx path is encryption and wherein the decryption and the encryption are performed as a single atomic operation while looping back the data from the Rx path to the Tx path; and
  program the data to a second location of the memory device.

2. The data storage device of claim 1, wherein the loopback mode comprises not providing the data back to a host device between the Rx path and the Tx path.

3. The data storage device of claim 1, wherein the plurality of operations in the Rx path comprises:
  decoding the data;
  decrypting the data; and
  verifying protection information associated with the data.

4. The data storage device of claim 3, wherein the decrypting uses a last generated key associated with the data.

5. The data storage device of claim 4, wherein the controller is further configured to generate a key associated with the data when the data is encrypted.

6. The data storage device of claim 4, wherein the plurality of operations in the Tx path comprises:
  generating protection information for the data;
  adding the generated protection information to the data;
  encrypting the data; and
  encoding the data.

7. The data storage device of claim 6, wherein the generated protection information is generated based on a logical block address of the second location.

8. The data storage device of claim 6, wherein the data programmed to the location of the memory device is the encoded data.

9. The data storage device of claim 1, wherein the controller is further configured to check and update protection information associated with the data in the Rx path and the Tx path dynamically.

10. The data storage device of claim 1, wherein the controller further comprises:
  a peripheral component interconnect (PCI) express (PCIe) bus;
  the Tx path coupled to the PCIe bus;
  a flash interface module (FIM) coupled to the Tx path and the memory device; and
  the Rx path coupled to the FIM and the PCIe.

11. The data storage device of claim 10, wherein the Tx path comprises:
  a Tx direct memory access (DMA) and data protection module;
  an encryption engine configured to encrypt the data;
  a redundant array of independent disks (RAID) engine; and
  an encoder configured to encode the data.

12. The data storage device of claim 11, wherein the Rx path comprises:
  a decoder configured to decode the data received from the memory device;
  a decryption engine configured to decrypt the data received from the decoder; and
  an Rx DMA and data protection module.

13. The data storage device of claim 12, wherein the storage tag module is configured to check a tag associated with the data, wherein the tag is provided by a host device associated with the data.

14. The data storage device of claim 12, wherein the copy accelerator is configured to provide the decrypted data from the Rx DMA and protection module to the Tx DMA and protection module.

15. The data storage device of claim 14, wherein the provided decrypted data is not accessible by a host device.

16. The data storage device of claim 10, wherein the copy accelerator is used to move data from one or more first locations of the memory device to a second location of the memory device.

* * * * *